United States Patent Office 3,439,399
Patented Apr. 22, 1969

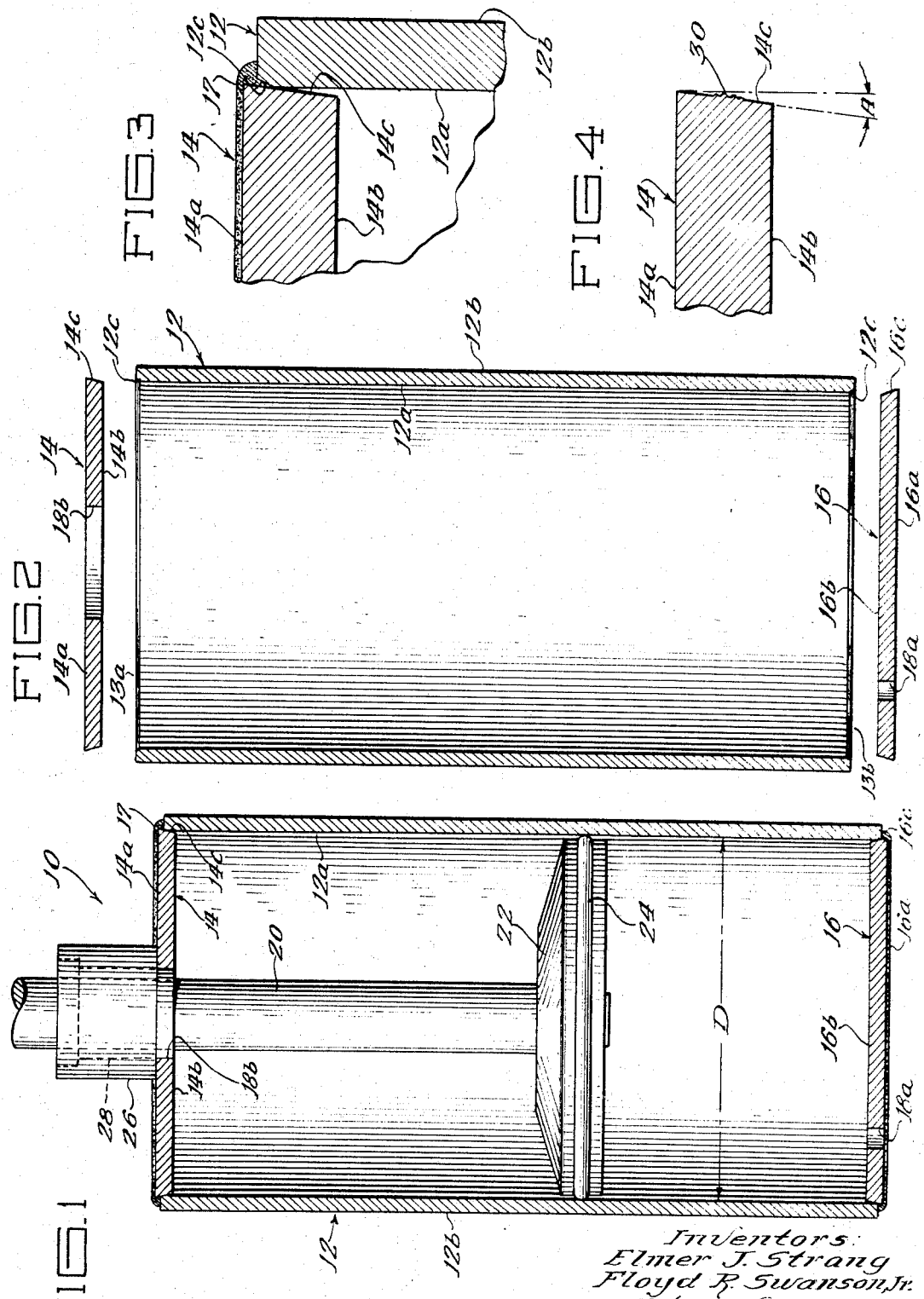

3,439,399
METHOD OF MAINTAINING A CYLINDER
ASSEMBLY ROUND
Elmer J. Strang and Floyd R. Swanson, Jr., Fort Dodge, Iowa, assignors to The Coats Company Inc., a corporation of Iowa
Filed Apr. 7, 1966, Ser. No. 540,994
Int. Cl. B23p 15/10
U.S. Cl. 29—156.4                               2 Claims

ABSTRACT OF THE DISCLOSURE

The method of maintaining cylinder tubing of a piston and cylinder device round by means of forming the opposed cylinder heads with tapered peripheries, the inner portion of the head being slightly undersize with respect to the minimum diametral dimension of the cylinder tubing and the outer portion of the cylinder heads being slightly oversize with respect to the maximum diametral deviation of the cylinder tubing, and inserting the cylinder heads into opposite ends of the tubing with the undersize portion inserted first, and securing the cylinder heads to the tubing.

---

This invention relates to piston and cylinder devices and more particularly to an improvement in maintaining the cylinder tubing round.

Typical construction for piston and cylinder devices which are to be used other than in high precision application includes a piece of tubing stock which serves as the cylinder element and disc-like heads of metal sheet-like stock secured to the ends of the tubing by suitable means such as welding, snap rings or the like. Since these cylinders are intended to be used in moderate or low precision applications, it is desirable that the production costs be kept relatively low.

It is not uncommon for the cylinder tubing to be manufactured within certain tolerances as to inner dimension as well as within certain tolerances as to roundness or "ovality." For example, it is common to accept such tubing which may be plus or minus .010 out of round. Satisfactory cylinders may be built from such tubing having such tolerances but ultimately the "ovality" takes its toll in wear upon the other components of the piston and cylinder devices, such as the piston seals and rod seals. To manufacture the tubing so that it would be precisely round would cause such a relatively large increase in the cost of manufacturing as compared to the desired minimal cost for such low precision cylinders as to not warrant the expense of the higher degree of accuracy.

This invention is directed to a means and a method for maintaining cylinder tubing, which may be manufactured within certain limits out of round, substantially absolutely round when assembled as part of a piston and cylinder device without adding significant additional assembly steps or machining operations and without adding significantly to the cost of manufacture and assembly of the cylinder.

It is therefore a primary object of this invention to provide a new and improved cylinder construction.

Another object of this invention is to provide a new and improved cylinder construction wherein the cylinder tubing which may be initially formed slightly out of round will be placed into a true round condition during the assembly of the cylinder.

Still another object of this invention is to provide an improved cylinder construction wherein the cylinder heads are provided with surfaces adapted for producing a truly round cylinder from cylinder tubing stock which may be slightly out of round upon assembly of the cylinder heads into the tubing.

A further object of this invention is to provide an improved method for producing a piston and cylinder device with truly round cylinder walls from slightly out of round cylinder tubing stock.

Other objects, features and advantages of the present invention will be apparent from the following description of the preferred embodiment illustrated in the accompanying drawings, in which:

FIGURE 1 is a longitudinal section view of an assembled piston and cylinder device utilizing the structure and method of this invention;

FIGURE 2 is an exploded longitudinal section view of the piston and cylinder device shown in FIGURE 1 prior to assembly;

FIGURE 3 is a fragmentary enlarged view of a portion of the assembled piston and cylinder device showing in greater detail the peripheral edge of the cylinder head and its association with the interior of the end of the cylinder tubing; and FIGURE 4 is a fragmentary enlarged sectional view of a portion of the cylinder head.

Referring now to the drawings, in FIGURE 1 there is shown a piston and cylinder device of the type which might be employed in non-precision operations, such as for providing a source of linear movement in a tire changer apparatus. The piston and cylinder device includes a generally circular cylindrical sleeve-like cylinder tubing 12 having generally circular cylindrical smoothly finished interior walls 12a and a circular cylindrical exterior 12b. Generally cylinder tubing is formed of a suitable heavy metal such as a steel alloy or the like. The interior wall of the tubing may be chamfered at 12c adjacent each of the open ends 13a and 13b.

The cylinder is enclosed by a pair of spaced generally circular cylindrical disc-like heads 14 and 16. These disc-like heads have generally flat, opposed, inner and outer faces 14a–16a and 14b–16b, respectively, joined by a tapered periphery 14c–16c, respectively. The heads are also usually formed from sheet-like stock of a relatively heavy metal similar to that utilized in forming the tubing. A bead of welding 17 is utilized to secure the heads at each end of the cylinder tubing in a substantially fluid-tight manner.

One head, such as head 16, may be provided with an opening 18a to permit the reception of an actuating fluid under pressure whereas the other head, such as head 14, may be provided with a generally centrally located opening 18b to permit the outward extension and relative reciprocation of piston rod 20 relative to cylinder 10. At its interior end, rod 20 mounts a piston head 22 having a suitable sealing element 24 in engagement with the interior wall 12a of the tubing 12. The rod extends outwardly through the cylinder through a hub 26 having a suitable bearing and sealing means 28 in association with the rod periphery.

As previously mentioned, piston and cylinder devices which are intended to be used in low precision operations are usually manufactured to relatively liberal tolerances as compared to high precision piston and cylinder devices. For example, cylinder tubing wherein the dimension across the diameter D (FIGURE 1) is to be approximately 7 inches may be allowed a plus or minus .003 diametral variation. In addition, in these low precision cylinders a given amount of out of roundness or "ovality" is permitted in the interior wall 12a. The variation in this dimension would also occur across a diametral line and may be as much as .010. Therefore, given a 7-inch cylinder with a permissible minus .003 diametral variation and a permissible .010 inch ovality tolerance, the dimension across a given diameter of the tubing may actually be 6.987 inches and still be within the maximum minus diametral tolerance allowable. Conversely, the dimension could be as great as 7.013 inches and still be within the maximum plus diametral tolerance.

The aforementioned tolerances do not substantially minimize the effectiveness of a cylinder operation. However, they do ultimately serve to contribute to premature wear of the piston head assembly 22 or the rod 20 since the location of the rod and piston head relative to the interior walls 12a of the cylinder may actually be very slightly off center although the tubing is still formed within the permissible tolerances. This invention is directed to a means for forming and maintaining a cylinder round which may be originally formed in a slightly out of round condition, which means does not substantially add to the cost of production nor to the steps in assembly of the piston and cylinder device.

To this end, the cylinder heads 14 and 16 are formed so that a diameter across the inner faces 14b and 16b, respectively, is a lesser dimension than the total tolerable minimum dimension permitted across the diameter D of the interior 12a of the cylinder tubing; and the diameter across the outer faces 14a and 16a is greater than the total maximum tolerable dimension permitted in the diameter of the interior of the cylinder. Thus in the given example, the diameter across faces 14b and 16b would be less than 6.987 inches; and the diameter across faces 14a and 16a would be greater than 7.013 inches. These dimensional differences are obtained by forming the cylinder heads with a small peripheral taper as represented by the angle A in FIGURE 4 so that the cylinder heads have a frusto-conical configuration. It has been found that in a 7-inch cylinder with the aforementioned tolerances, an angle A of two degrees and thirty minutes is satisfactory for this purpose.

Therefore, when the cylinder heads are assembled into the cylinder tubing, the external periphery of each head will reach a point where the dimension across the periphery matches that of the interior 12a of the cylinder of the tube. The cylinder heads will be formed perfectly round so that they will cause the cylinder tubing to spring slightly into a truly round configuration, this being permitted by the basic nature of the material of the tubing 12, which, as previously mentioned, is usually a steel alloy. Generally this act of assembly occurs when the welder who applies the bead of welding 17 originally lightly hammers the heads into place at the ends of the cylinder. The chamfer 12c formed at the interior of each end of the cylinder tubing assists in the initial registration of the cylinder heads into the cylinder tubing. Thus this operation is sufficient to round out the cylinder and yet does not require any additional steps in assembly and manufacture of the cylinder.

The cylinder heads may be formed with this taper either by machining or blanking in a die. Again, giving a 7-inch cylinder as an example, the cylinder walls may be approximately 3/16 of an inch in thickness and one head, such as 14, may be 3/8 of an inch in thickness and the other head, 16, may be 1/4 of an inch in thickness. One or both of the heads 14 and 16 may be stamped out of plate or sheet-like stock by blanking. Where only one head is formed by blanking, the other head may be machined round with the tapered configuration. In the case where one head is machined, adding the slight taper, such as 14c, will only slightly add to the cost of manufacture of the cylinder head, and this additional cost will be of such an insignificant amount as to be acceptable.

Where the heads are formed by blanking in a die, it is within the skill of one in the art to so design and operate an appropriate die stamping structure as to form a circular cylindrical disc-like element such as a cylinder head with a taper as indicated by angle A, for example, of two degrees and thirty minutes. Also, in such a case the medial portion of the periphery of the head will have a very slightly roughened surface 30 which is that portion of the surface which has been broken as the ram and die move relative to each other. This slight roughened surface is a common occurrence in the art of die blanking and is so infinitesimal as to be substantially smoothed out when the cylinder heads are tapped into position at the ends of the cylinder tubing.

The foregoing detailed description has been given for clearness of understanding only, and no unnecessary limitations should be understood therefrom, as some modifications may be obvious to those skilled in the art.

What is claimed is:

1. The method of producing a piston and cylinder device having cylinder walls with truly round interior configurations, comprising the steps of: providing approximately round cylinder tubing; providing two cylinder heads each with a first radial surface of a smaller diametral dimension than the minimum tolerable diametral deviation of the cylinder tubing and a second radial surface having a greater diametral dimension than the maximum tolerable diametral deviation of the cylinder tubing and fitting the cylinder heads into the open ends of the cylinder tubing with the first radial surface of each head facing inwardly to force the cylinder tubing to assume a truly round interior configuration and securing the heads to the cylinder to retain the truly round configuration.

2. The method of claim 1 wherein the cylinder heads are subjected to a peripheral tapering operation prior to being inserted into the cylinder tubing.

References Cited

UNITED STATES PATENTS

| | | | |
|---|---|---|---|
| 1,472,616 | 10/1923 | Richman | 113—120 |
| 2,001,854 | 5/1935 | Shoemaker et al. | |
| 2,170,464 | 8/1939 | Rosenberry. | |
| 2,547,521 | 4/1951 | Buehler. | |
| 2,949,852 | 8/1960 | Schaefer. | |
| 3,024,300 | 3/1962 | Martin | 29—525 |
| 3,156,033 | 11/1964 | Brown | 29—148.4 |

JOHN F. CAMPBELL, *Primary Examiner.*

P. M. COHEN, *Assistant Examiner.*

U.S. Cl. X.R.

29—525, 475; 254—93; 60—52